Figure 1:
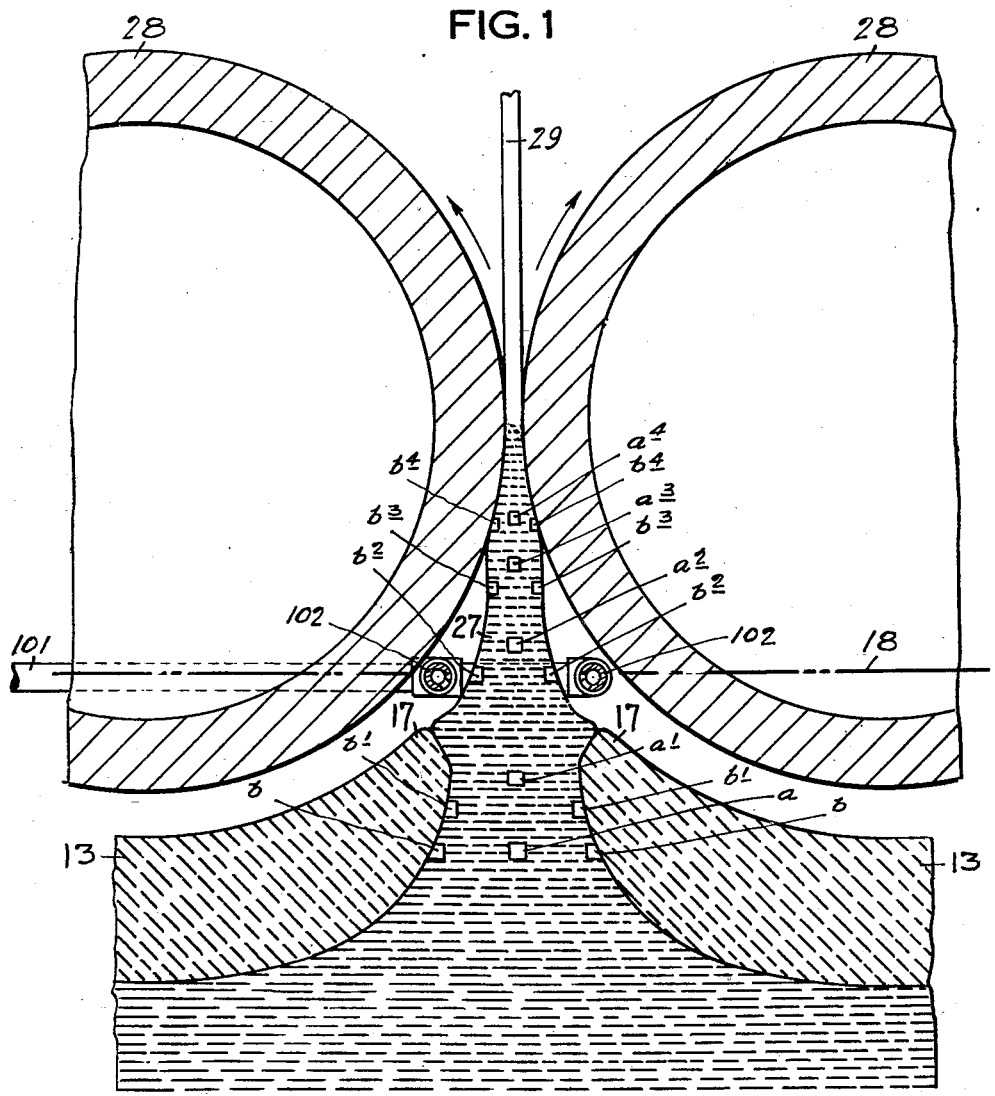

Oct. 11, 1927.

G. E. HOWARD 1,645,053

METHOD OF AND APPARATUS FOR FORMING SHEET GLASS

Filed Feb. 6, 1926 6 Sheets-Sheet 1

INVENTOR
George E. Howard
By Robson D Brown
Attorney.

Oct. 11, 1927.

G. E. HOWARD 1,645,053

METHOD OF AND APPARATUS FOR FORMING SHEET GLASS

Filed Feb. 6, 1926    6 Sheets-Sheet 2

INVENTOR
George E. Howard
By Robert D Brown
Attorney.

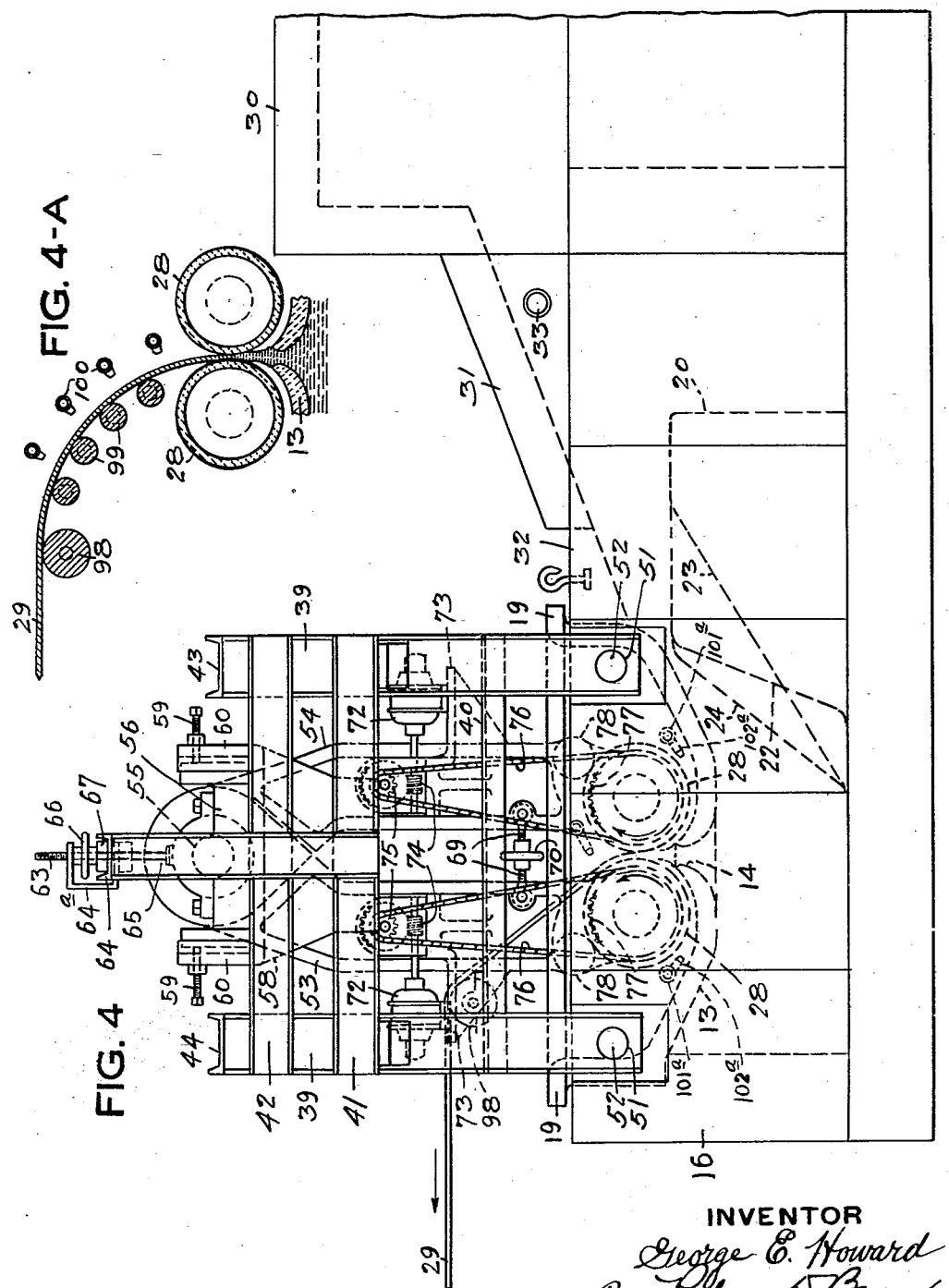

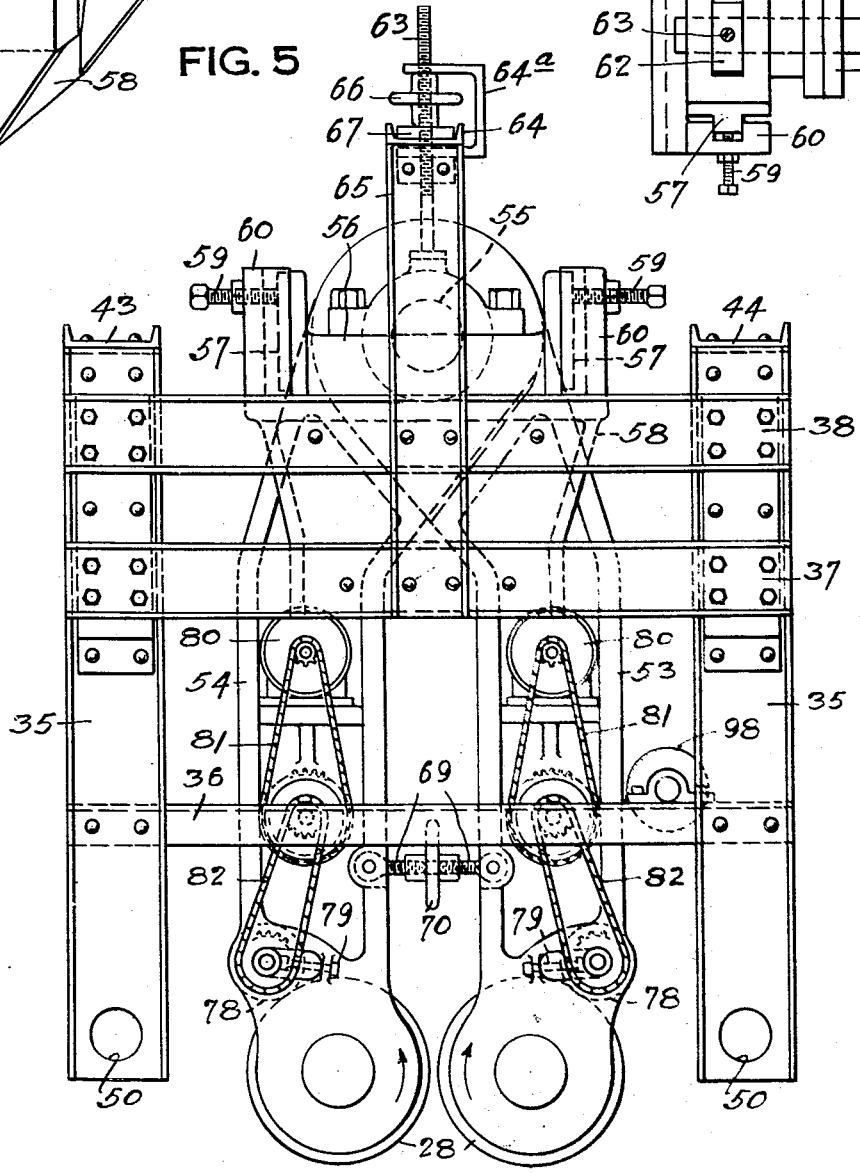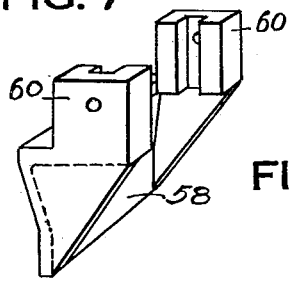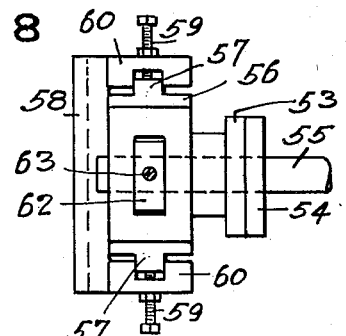

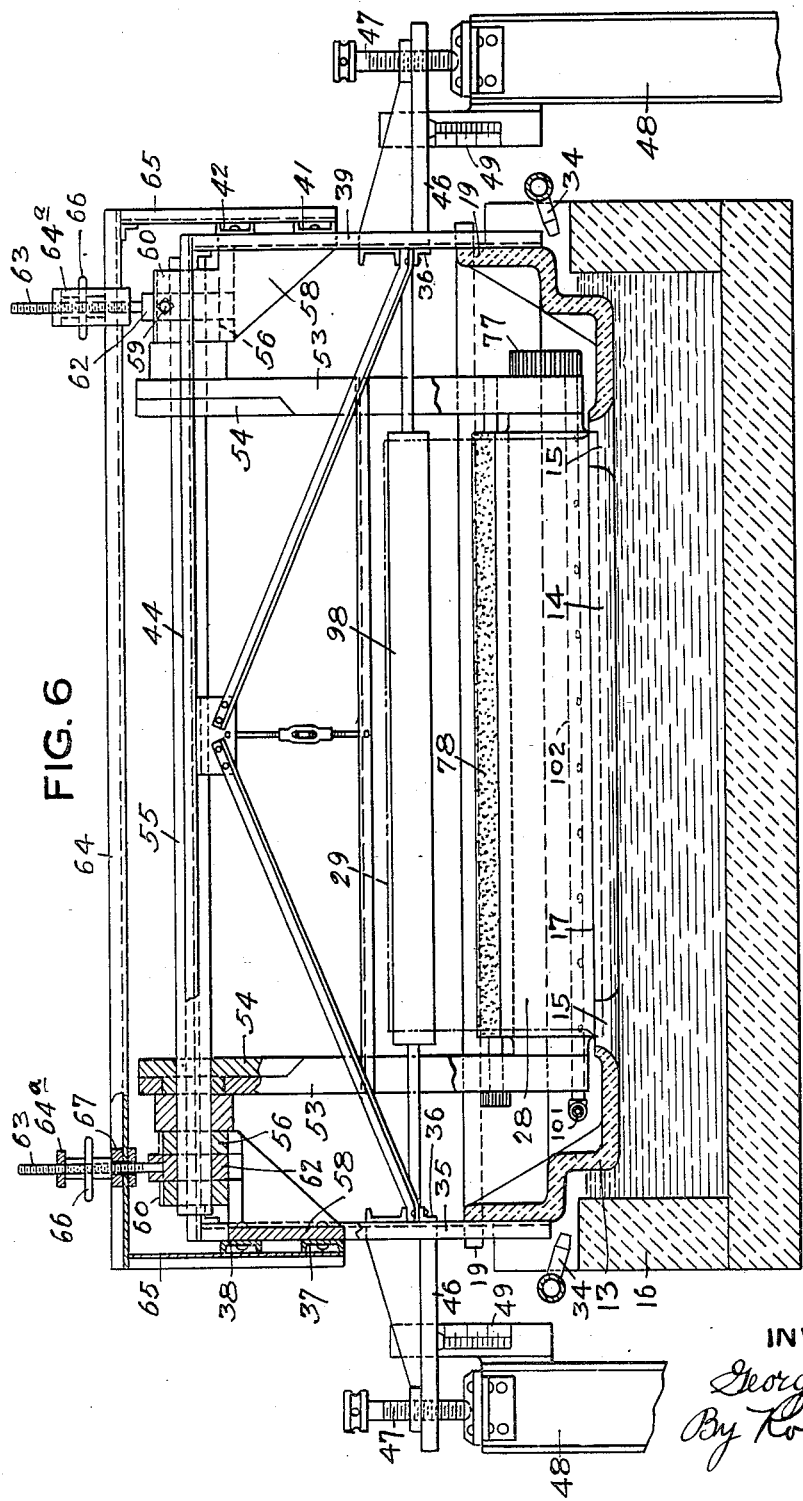

Oct. 11, 1927.

G. E. HOWARD 1,645,053

METHOD OF AND APPARATUS FOR FORMING SHEET GLASS

Filed Feb. 6, 1926     6 Sheets-Sheet 6

INVENTOR
George E. Howard
By Robson D. Brown
Attorney.

Patented Oct. 11, 1927.

1,645,053

UNITED STATES PATENT OFFICE.

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE.

METHOD OF AND APPARATUS FOR FORMING SHEET GLASS.

Application filed February 6, 1926. Serial No. 86,518.

My invention relates to a method and apparatus for forming sheet glass, and is particularly useful in connection with the formation of plate glass, although it is not limited thereto.

One object of my invention is to provide an improved method and apparatus for continuously producing sheet glass of a high degree of homogeneity and freedom from imperfections.

Another object of my invention is to provide an improved means for maintaining the width of the sheet of glass during the process of its formation.

A further object of my invention is to provide an improved form of apparatus that is particularly suitable for accomplishing the foregoing objects, and to simplify and improve generally the structure and operation of sheet glass forming apparatus.

In practicing my invention, I employ what may be termed a submerged drawing ring, which involves the provision of a dished refractory ring member whose peripheral edges are disposed above the level of glass in the tank, and which is provided with a slot that is normally below the glass level, the slot being preferably enlarged at its ends to provide thicker portions of glass at such points, and thus reducing the tendency of the edges of the sheet to draw in toward the middle of the sheet.

A pair of rolls is provided for forming a sheet or plate from the glass which flows through the orifice, and for advancing the sheet or plate, preferably in a vertical direction. The lower faces of the rolls extend into the dished portion of the drawing ring or at least to a point below the orifice thereof, so as to engage the glass at a point close to the orifice. I also contemplate the provision of means for either cooling or heating the glass adjacent to its point of entry between the rolls, in order to have such glass of the proper consistency for forming a sheet. Furthermore, I provide means for heating or cooling the sheet of glass as it leaves the forming rolls, so as to maintain the sheet cool enough to avoid sagging thereof or hot enough to prevent cracking or uneven bending.

Means are also provided for shifting the position of the ring with respect to the bath of molten glass, in order to move it to and from operative position and to vary the rate of flow through the orifice, such rate of flow being dependent upon the difference in height as between the orifice and the level of the molten glass in the bath. It is desirable, however, that the orifice be disposed below the level of the glass bath, since conditions may be such that the drawing action of the forming rolls will not be sufficient to effect proper feed.

The sheet forming rolls are also adjustable vertically and horizontally with respect to the drawing ring, as well as being adjustable with respect to one another.

The term "meniscus" is employed herein as designating the formation at the surface of the glass bath which is caused by the pulling action of drawing members moving upwardly from the molten glass, as in the case of the baits employed in the older window glass processes, or as designating a similar protuberance which is formed by my sheet-forming rolls upon the glass stream issuing from the orifice, whether such glass is under pressure or is subjected merely to the lifting or pulling action of the rolls.

Various other important structural and functional features are set forth in the specification and drawings of this application.

Figure 2:
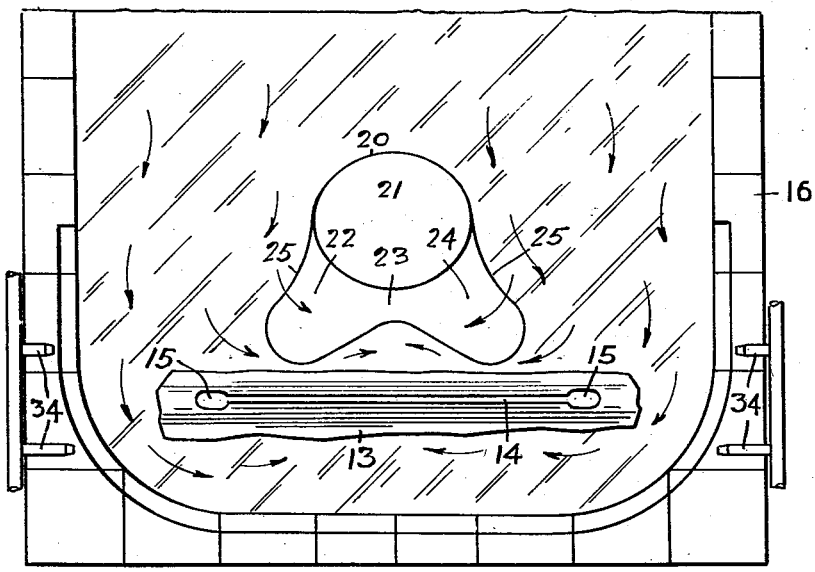
Figure 3:
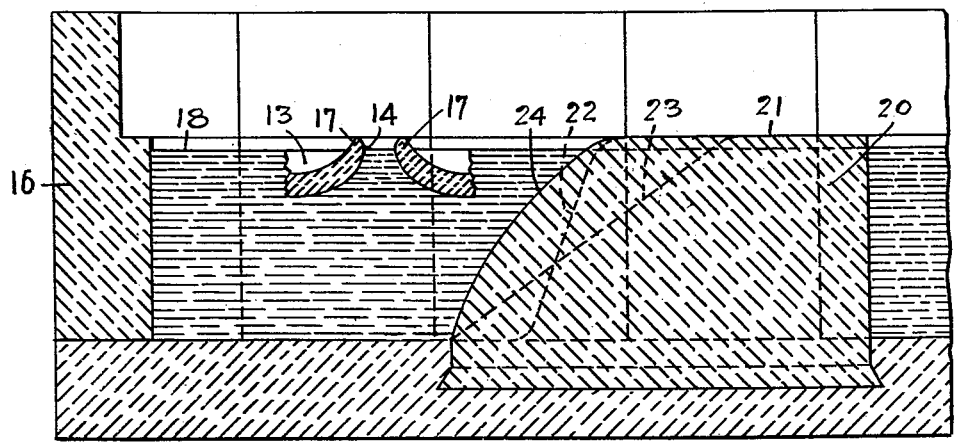
Figure 9:
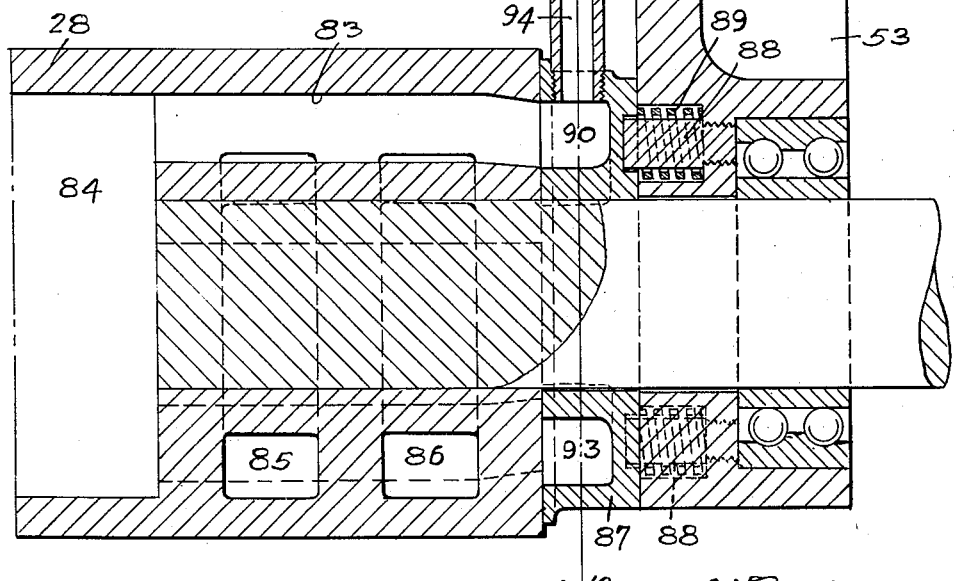
Figure 10:
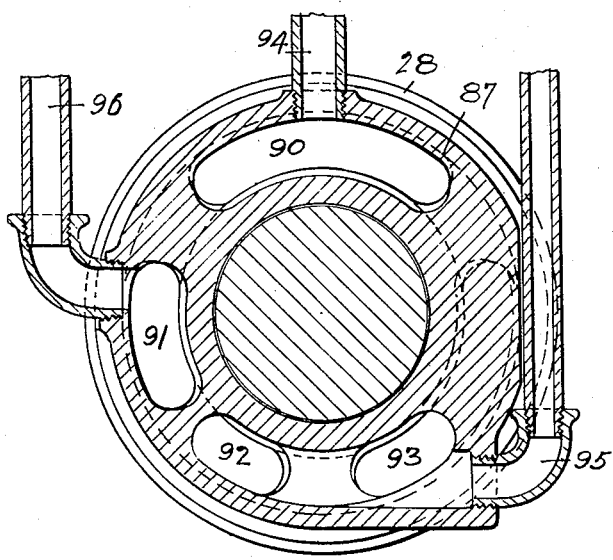
Figure 11:
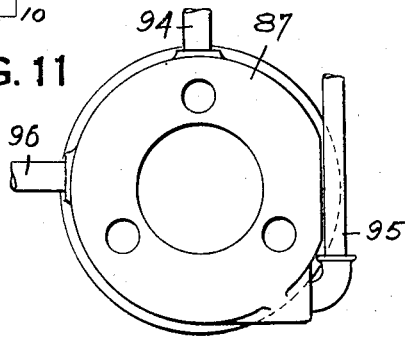
Figure 12:
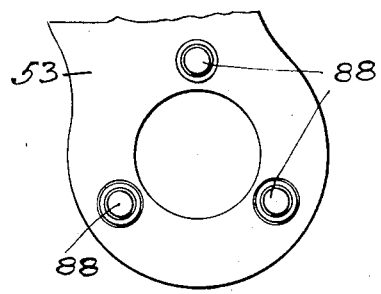

One form of apparatus by means of which the invention may be practiced is shown in the accompanying drawings, wherein Fig. 1 is a view showing diagrammatically the manner in which molten glass emerges from the slot or orifice, and the action thereof; Fig. 2 is a fragmentary plan view of the drawing ring and its orifice, and shows means for dividing the stream of glass as it flows toward the orifice; Fig. 3 is a sectional view of the apparatus of Fig. 1; Fig. 4 is a side elevational view of the apparatus of Fig. 3, and a portion of the glass furnace, in conjunction with the sheet forming mechanism; Fig. 4ª shows a modification of the apparatus of Fig. 4; Fig. 5 is an elevational view, on an enlarged scale, of a portion of the apparatus of Fig. 4, but looking at the opposite end thereof; Fig. 6 is a view, partially in end elevation and partly in section, looking from the right hand side of Fig. 4; Fig. 7 is a perspective elevational view, of the roll adjusting mechanism of Fig. 6; Fig. 8 is a plan view of the apparatus of Fig. 7; Fig. 9 is a detail sectional view, on an enlarged scale, showing the manner in which cooling fluid may be circulated through the rollers; Fig. 10 is a vertical sectional view taken on the line 10—10, of Fig. 9; Fig. 11 is an elevational view of a portion of the apparatus of Fig. 9, looking from the left hand side thereof, and Fig. 12 is an end elevational view of the apparatus of Fig. 9, looking from the right hand side thereof.

Referring to Figs. 1 and 2, I have shown a drawing ring 13 that has a slot 14 which is enlarged at its ends as indicated at 15. The drawing ring is normally disposed within a forehearth 16 containing molten glass which is caused to flow through the orifice 14 in a manner to be hereinafter described. The walls of the orifice 14 are flared upwardly as indicated at 17. When in operative position the lips 17 are preferably below the molten glass level 18, the sheet drawing operation being conducted at such rate of speed that the glass cannot accumulate above the orifice and flow downwardly along the upper faces of the lips 17. The edges of the drawing ring 13 are upturned as indicated at 19 in Fig. 6, so that the ring is of generally dished form with its upturned edges 19 above the glass level 18. While the lips 17 are shown in Fig. 3 as above the glass level 18, this is preferably not their normal position, the ring being shown in this figure as elevated to prevent glass flowing over the tops of the lips 17 while the sheet drawing mechanism is inactive.

Referring more particularly to Fig. 2, I provide a stream dividing block or island 20 of refractory material that is disposed substantially at the mid-portion of the stream of glass which is indicated by the arrows. The island 20 may project above the surface of the glass as indicated at 21, but its front portion is inclined as indicated at 22 and 23. The island 20 serves the purpose of dividing the stream of glass so that molten glass of more uniform temperature will be supplied to various points throughout the length of the slot 14. If the island were not provided, the hottest portion of the glass would be directed against the mid portion of the ring, with consequent lack of uniformity as between the edges and the mid portion of the sheet which is drawn from the slot. The forward side of the island 20 is inclined most at its mid portion 23, to provide a pocket of some depth between the island 20 and the mid portion of the ring, while to either side of the inclined portion 23 the wall has less inclination, as indicated at 22 and 24. Therefore, glass which flows past the island 20 toward the drawing ring will take curved paths as indicated by the reference numerals 25. Hot glass is thus directed toward the outer ends of the drawing slot and caused to travel along said slot and into the space in front of the island.

Molten glass which emerges from the slot 14 is practically homogeneous and of fairly uniform viscosity and temperature, and is fed forward by the weight of the molten glass in the tank or forehearth which extends to the level 18. The exuded glass takes the form of a meniscus 27 (Fig. 1). The rolls 28 engage the glass at the meniscus 27 and not only shape the sheet of glass but feed it upwardly from the mass of glass contained in the meniscus, in a manner to be hereinafter more fully described.

In order to more clearly explain the manner in which I avoid relative shifting of the particles of the glass, I will designate (Fig. 1) the relative positions of certain particles by the reference characters $a$ and $b$. These particles are shown as in horizontal alignment when the glass enters the orifice. Owing to the friction exerted by the walls of the orifice, the movement of the particles $b$ is retarded, thus causing the particles $a$ to have a greater relative speed. When the particles $a$—$b$ have reached the positions $a^1$—$b^1$, the particles $a^1$ are considerably in advance of particles $b^1$. When the particles have reached the points $a^2$—$b^2$ they are still vertically displaced, to perhaps a somewhat greater degree than at the points $a^1$—$b^1$. However, at points $a^3$—$b^3$ the rolls exert a more pronounced pulling action upon the surface particles $b$ while the movement of the hotter mid portion $a$ lags somewhat, causing the distance of vertical offset as between the particles $a$ and $b$ to be reduced as shown at $a^4$—$b^4$, and this displacement is still further reduced as the particles continue their upward movement. The particles at the surface are therefore restored to their relative positions with respect to the particles at the mid portion of the sheet and ream, which arises from the lack of homogeneity, is thereby reduced to a minimum.

In Fig. 4 I have shown the forehearth 16 in its relation to a portion of the furnace 30. That portion of the forehearth to the rear of the drawing ring 13 is provided with cover blocks 31 and 32. The space between the under surfaces of these cover blocks and the molten glass permits the hot gases from the tank 30 to flow over the glass in the forehearth and burners 33 may be provided to still further heat these gases. Burners 34 (Fig. 6) extend through the sides of the forehearth 16 to supply heat to the drawing ring and the under side thereof when the drawing ring is elevated, to prevent chilling of the glass beneath the ring during periods wherein the drawing mechanism is not being operated.

*Details of supporting and adjusting mechanism.*

The drawing mechanism is supported at one end by a framework consisting of a pair of vertical bars 35 (Fig. 5) connected by cross bars 36—37—38, and at its other end is supported by framework consisting of vertical bars 39 (Fig. 4) that are connected by cross bars 40—41—42. The tops of the bars 35 and 39 are joined by channel irons 43 and 44.

As shown in Fig. 6, each of the four corners of the main frame just described has secured thereto a bracket 46. A set screw 47 has threaded engagement with the brackets 46 and each rests upon a supporting pillar 48, so that the main frame, together with the drawing ring and the sheet-forming rolls carried thereby, may be raised and lowered with respect to the glass bath. Scale bars 49 are secured to the pillars 48, to indicate the various adjusted positions of the screws 47.

The lower ends of the uprights 35 and 39 are perforated as indicated at 50 and 51 to support the ends of bars 52 that support the the drawing ring 13.

As shown more plainly in Figs. 5 and 6, the sheet-forming rolls 28 are supported in the lower ends of pairs of arms 53 and 54 that are pivotally supported upon a shaft 55. The ends of the shaft 55 are supported in bearing blocks 56 (Figs. 6, 7 and 8) that have bosses 57 which are adapted to fit into recesses in the ends of supporting blocks 58. The blocks or brackets 58 are bolted or otherwise secured to the cross pieces 37—38 and 41—42 of the main frame. Adjusting screw 59 extend through the upstanding arms 60 of the brackets 58 in position to engage the bosses 57 and effect adjustment of the bearing blocks 56 and the shaft 55 in a direction transversely of said shaft. Such movement of the shaft carries with it the roll-supporting arms 53—54, thereby changing their positions with respect to the orifice of the drawing ring in a horizontal plane. Thus, if the rolls 28 at one end appear to be so positioned transversely of the drawing orifice as to not exert uniform drawing action on both sides of the sheet of glass being formed, one or both of the pairs of set screws can be adjusted to bring the said ends of the rolls into proper relative position with respect to the orifice. The utility of this feature results from the fact that portions of one wall of the slot may become worn away near one end to a greater extent than the other slot wall, with consequent unbalancing of drawing action, unless the rolls are adjusted to meet the condition. Another condition requiring angular adjustment of the rolls transversely of the slot would arise where, through non-uniform temperature conditions at the sides of the meniscus, one roll might exert a greater drawing force than the other roll, even though the rolls were parallel to the slot.

Each of the bearing blocks 56 is provided with a central ring-like supporting member 62 (Fig. 6) that has rotatable engagement with the shaft and which has secured thereto an adjusting screw 63 which extends upwardly through a channel iron 64 and bracket 64ª (Fig. 5). The channel iron 64 is connected at its ends to vertical bars 65 which are in turn secured to cross bars 37—38 and 41—42. A hand wheel 66 has a hub portion which is in threaded engagement with the screw 63 and is disposed between the upper flange of the channel bar 64 and a plate 67 that connects the upper ends of the upright bars 65. When the hand wheel 66 is rotated, the bearing blocks 56 will be moved vertically within the bracket 58, thereby shifting the shaft 55 and the rolls 28 carried thereby with respect to the drawing ring 13, it being remembered that the drawing ring is rigidly secured to the main framework.

The arrangement just described permits the rolls to be vertically adjusted with respect to the drawing ring, or either end of the rolls to be adjusted with respect thereto, thereby permitting the rolls to be brought into operative engagement with the molten glass at any desired distance from the orifice. It may be that conditions at one end of the rolls do not coincide with conditions at the other end thereof. In that case, it may be necessary to shift the position of the rolls vertically at one end to compensate for such variation in conditions.

The pivoted roll-supporting arms 53—54 at each end of the machine are each pivotally connected to an eye bolt or threaded rod 69, the bolts of each pair being reversely threaded, and each pair having engagement with a right and left hand threaded nut 70. Upon rotation of the nut 70 the spacing between the rolls 28 is varied in accordance with the thickness of sheet desired.

*Roll driving mechanism.*

The rolls 28 are each driven by a motor 72 (Fig. 4) that is mounted upon a bracket 73 which is secured to the supporting arms 53 or 54, as the case may be. The motors 72 are connected through worm gearing 74 with pinions 75 that are in turn connected to chain belts 76 that drive the sprocket wheels 77 which are connected to the roll shafts. I find it advantageous to provide separate motors for driving the sheet-forming rolls 28, because conditions may require that one roll be driven faster than the other one to properly form a sheet.

For the purpose of cleaning the rolls 28, I provide brushes 78 (Fig. 5) whose shafts are supported in the arms 53—54 (Fig. 6) and are adjustable with respect to the rolls 28 by means of adjusting screws 79 (Fig. 5). The brushes 78 are driven by motors 80 that are preferably mounted upon the arms 53 and 54 at the end of the machine opposite to that at which the roll driving motors 72 are mounted. The motors 80 are connected to the brushes through driving chains 81 and 82 and their sprocket members. A motor is provided for each brush as a matter of convenience, but it will be apparent that one motor could be employed for driving both brushes or that the brushes could be driven from one or both of the roll driving motors.

*Roll cooling apparatus.*

Referring now to Figs. 9 to 12, I have shown details of the manner in which the rolls 28 may be cooled. The rolls are cored as indicated at 83—84—85 and 86 and by various dotted lines, so that cooling fluid such as water may circulate through the rolls and exert a chilling action upon the glass being operated upon. A distributor ring 87 is disposed between the end of the roll and the supporting arm 53. The ring 87 is held against rotation relative to the arm 53 by means of studs 88 that extend into recesses in the ring and the arm, respectively. Springs 89 are interposed between adjacent faces of the arm 53 and the ring 87 to hold the ring 87 in tight engagement with the end of the roll 28. The abutting faces of the distributor ring and the roll are preferably ground to minimize danger of leakage of water.

The distributor ring is cored as indicated at 90—91—92 and 93 and by the dotted lines extending between said openings, and is provided with a water inlet 94 and an outlet pipe 95. An air suction pipe 96 is connected to any suitable source of vacuum (not shown). Water is admitted through the pipe 94 to the cored opening 90 from whence it flows through openings 83 or 86 as the case may be, to the interior of the roll 28, the supply of water being suitably controlled by a valve (not shown). The cored openings in the roll 28 are so arranged that there will always be an unobstructed circuitous path through the roll, for the water, from the inlet 94 to the outlet 95. The vacuum pipe 96 is preferably connected to the distributor ring 87 at about its mid portion so that all water in excess of that required to maintain the desired height of water in the roll will be withdrawn through the pipe 96, thus making for uniformity in cooling of the roll. If the depth of water in the roll varied there would be variation in temperature of the roll and consequent non-uniformity in the glass sheet.

When spurts of water to an excessive amount are discharged from the vacuum pipe 96, the operator will know that water is being supplied to the roll more rapidly than it is being withdrawn through the outlet pipe 95 and will increase flow through the pipe 95. The vacuum also performs an important function in that a suction is created that prevents leakage of water past the contacting surfaces between the distributor ring 87 and the end of the roll 28, as well as to prevent oozing of water through those parts of the roll which are very porous or where there is a soft spot in the roll, which would normally permit water to penetrate too near the surface of the roll.

As shown in Fig. 4 of the drawing, the glass sheet 29 as it leaves the roll 28 in its upward travel is deflected laterally over a guide roll 98 from which it may be directed to a leer (not shown) and thereafter ground and polished in the usual manner.

In Fig. 4ª I show guiding rolls 99 arranged in an arcuate path between the forming rolls 28 and the guiding roll 98, so that instead of the sheet having two short bends—one at the left hand roll 28 and the other at the guide roll 98, a single long bend is made, thus avoiding unnecessary distortion.

In order to maintain the sheet at the proper temperature after it leaves the forming rolls 28 and before entering the leer, I provide pipes 100 having nozzles through which cooling fluid may be supplied to prevent sagging of the glass in cases where it is too soft to be self sustaining, or through which gas may be supplied to supply heat to the glass sheet and maintain it at sufficiently high temperature to insure that the glass will not be too brittle when being bent to its arcuate path.

Provision is also made for maintaining the glass at the proper temperature just before it enters the sheet-forming rolls. This means may consist, as shown in Figs. 1 and 4, of pipes 101 and 101ª that serve as conduits for conveying the gas or fuel to jet pipes 102 and 102ª, respectively, that extend parallel to the rolls 28 at their undersides. If the glass is too hot to be properly drawn between rolls 28, jets of cooling fluid can be directed through the pipes 102, while if it is necessary to increase the temperature of the glass, the pipes 102 may be employed as burners.

Another advantage present in connection with my apparatus arises from the fact that the drawing ring and other sheet forming mechanism are of unitary construction, by reason of their connection to the framework 35—39, etc. The drawing unit can therefore be transported from one set of pillars 48 to a corresponding set of pillars at another furnace, or can be removed for repairs and another unit substituted therefor. This arrangement avoids the necessity of allowing a furnace to remain idle when a drawing ring requires repairs, and also permits a drawing unit to be continued in service with another furnace when it becomes necessary to repair the particular furnace at which the unit has been installed.

I claim as my invention:

1. The method of drawing sheet glass which comprises advancing a stream of glass upwardly through an orifice into operative engagement with a pair of sheet-forming rolls, and varying the angular position of the rolls with respect to the orifice, in a horizontal plane, in accordance with the temperature of the glass.

2. The method of forming sheet glass, which comprises directing a stream of glass from a body of molten glass through a slotted orifice to a sheet-forming roll, and varying the positions of said roll and said orifice relative to the body of molten glass, in accordance with the temperature of the glass.

3. The method of forming sheet glass, which comprises bringing molten glass into contact with a hollow sheet-forming roll, maintaining the interior of the roll under sub-atmospheric pressure, and admitting cooling fluid to said roll.

4. The method of forming sheet glass, which comprises bringing molten glass into contact with a hollow sheet-forming roll, providing an exhaust port connected to said roll at substantially its mid portion, maintaining said port under vacuum, and admitting cooling fluid to the roll.

5. The method of controlling the temperature of plastic materials, which comprises bringing said materials into contact with a hollow roll, admitting temperature-controlling fluid to said roll, and exhausting the fluid from the roll at a predetermined level.

6. Sheet-glass forming apparatus comprising a ring member having an upwardly directed orifice, a pair of sheet-forming rolls disposed above said orifice, and means for simultaneously adjusting the positions of said ring member and rolls relative to a glass bath.

7. Sheet-glass forming apparatus comprising a ring member having an upwardly directed orifice, a pair of sheet-forming rolls disposed above said orifice, and means for independently adjusting the positions of said ring member and rolls relative to a glass bath.

8. Sheet-glass forming apparatus comprising a ring member having an upwardly directed orifice, a pair of sheet-forming rolls disposed above said orifice, means for simultaneously adjusting the positions of said ring member and rolls relatively to a glass bath, and means for directing a temperature controlling fluid against the surface of the glass issuing from said ring at a point in advance of the sheet-forming rolls.

9. Sheet-glass forming apparatus comprising a ring member having an upwardly directed orifice, a pair of sheet-forming rolls disposed above said orifice, means for simultaneously adjusting the positions of said ring member and rolls relatively to a glass bath, and means for supplying a heating fluid to the underside of said ring when the ring is in spaced relation to the body of molten glass.

10. Means for controlling the temperature of plastic material comprising a hollow roll, a header member having passages communicating with the interior of the roll, means for supplying fluid to said header, means for withdrawing cooling fluid from said header, and a vacuum pipe connected to said header at a point above the withdrawing means.

11. The combination with a hollow rotatable member and means for circulating a fluid therethrough, of means for connecting the interior of said member to a vacuum, for the purpose of preventing leakage of the fluid or for maintaining a desired liquid level in said rotatable member.

12. Sheet-glass forming apparatus, comprising a ring member having an upwardly directed orifice, a pair of sheet forming and drawing rolls disposed above said orifice, and means for directing a temperature-controlling fluid against the surface of the glass issuing from said ring, at a point in advance of the sheet forming rolls.

13. Means for controlling the temperature of plastic material, comprising a hollow roll, means for admitting fluid through and withdrawing fluid from said roll at points below a given plane, and a vacuum pipe communicating with said roll at a point above said plane.

14. Means for controlling the temperature of plastic material, comprising a hollow roll, open at one end, a shaft-like extension on said end of the roll, a header member surrounding said extension and having a recess that communicates with the interior of the roll, the said header member being normally stationary, and provided with inlet and outlet passages in its peripheral portion, and means for yieldably holding said header member in engagement with the end of the roll.

15. Means for controlling the temperature of plastic material, comprising a hollow roll, open at one end, a shaft-like extension on said end of the roll, a header member surrounding said extension and having a recess that communicates with the interior of the roll, the said header member being normally stationary, and provided with inlet and outlet passages in its peripheral portion, and provided with a vacuum pipe opening at a point above said inlet and outlet openings, and means for yieldably holding said header member in engagement with the end of the roll.

16. The method of drawing sheet glass which comprises directing a stream of molten glass from a glass bath upwardly through an orifice that is located at a substantial distance below the level of the said bath, causing a meniscus to be formed above said orifice that extends to a point above the level of the glass bath, bringing sheet-forming rolls into operative engagement with the upper portion of said meniscus, and controlling the temperature of the meniscus at points intermediate the orifice and the point at which it is engaged by the rolls.

17. The method of forming sheet glass which comprises directing a stream of molten glass upwardly through an orifice, causing a meniscus to be formed that extends for a substantial distance above said orifice, bringing sheet-forming rolls into engagement with the upper end of said meniscus, the portions of the meniscus below its point of engagement with the rolls being unobstructed, and controlling the temperature of the meniscus at points above said orifice.

Signed at Butler, this 5th day of January, 1926.

GEORGE E. HOWARD.